(12) United States Patent
Kurono et al.

(10) Patent No.: US 9,069,072 B2
(45) Date of Patent: Jun. 30, 2015

(54) RADAR APPARATUS AND TARGET DETECTING METHOD

(71) Applicant: FUJITSU TEN LIMITED, Kobe-shi, Hyogo (JP)

(72) Inventors: Yasuhiro Kurono, Kobe (JP); Hisateru Asanuma, Kobe (JP); Shinichi Shibata, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 295 days.

(21) Appl. No.: 13/793,225

(22) Filed: Mar. 11, 2013

(65) Prior Publication Data

US 2013/0249731 A1 Sep. 26, 2013

(30) Foreign Application Priority Data

Mar. 26, 2012 (JP) ................................ 2012-069451

(51) Int. Cl.
*G01S 13/42* (2006.01)
*G01S 13/32* (2006.01)
(Continued)

(52) U.S. Cl.
CPC ................. *G01S 13/42* (2013.01); *G01S 7/412* (2013.01); *G01S 13/345* (2013.01); *G01S 13/931* (2013.01); *G01S 2013/0263* (2013.01); *G01S 2013/9375* (2013.01); *G01S 2007/403* (2013.01)

(58) Field of Classification Search
CPC ............. G01S 7/02; G01S 7/41; G01S 7/411; G01S 7/412; G01S 7/40; G01S 7/4004; G01S 7/4026; G01S 2007/403; G01S 13/02; G01S 13/06; G01S 13/08; G01S 13/32; G01S 13/34; G01S 13/345; G01S 13/42; G01S 13/88; G01S 13/93; G01S 13/931; G01S 2013/0236; G01S 2013/0245; G01S 2013/0263; G01S 2013/9371; G01S 2013/9375

USPC ............. 342/73, 89, 118, 128–133, 146, 147, 342/175, 192–197, 27, 28, 70–72, 90, 13, 342/16, 17, 33, 42–46, 74–80, 91, 104–109
See application file for complete search history.

(56) References Cited

U.S. PATENT DOCUMENTS 3,765,019 A * 10/1973 Kosowsky ...................... 342/33
3,774,207 A * 11/1973 Yaplee et al. ................... 342/76
(Continued)

FOREIGN PATENT DOCUMENTS

| CN | 1450361 A | 10/2003 |
| JP | A-2004-108851 | 4/2004 |

OTHER PUBLICATIONS

Nov. 15, 2014 Office Action issued in Chinese Application No. 2013100601954.

*Primary Examiner* — Bernarr Gregory
(74) *Attorney, Agent, or Firm* — Oliff PLC

(57) ABSTRACT

A radar apparatus includes a retrieval unit, an estimation unit, a calculation unit, and a determination unit. The retrieval unit retrieves a strong reflection object based on a signal strength which a frequency spectrum of a beat signal generated by mixing a transmission signal which is frequency-modulated and emitted and a reception signal which is formed in the transmission signal is reflected on a target indicates. The estimation unit estimates an estimation orientation which is an orientation of a target assumed to be present around the strong reflection object, based on a relative distance to the strong reflection object. The calculation unit calculates power which is the signal strength for the estimation orientation by generating an orientation spectrum in the estimation orientation based on a frequency component corresponding to the relative distance. The determination unit determines whether there is the target in the estimation orientation based on the power.

14 Claims, 12 Drawing Sheets

(51) Int. Cl.
*G01S 13/93* (2006.01)
*G01S 7/41* (2006.01)
*G01S 13/34* (2006.01)
G01S 13/00 (2006.01)
G01S 13/02 (2006.01)
G01S 7/40 (2006.01)

(56) References Cited

U.S. PATENT DOCUMENTS

| | | | | |
|---|---|---|---|---|
| 4,035,760 A | * | 7/1977 | Asbury et al. | 342/109 |
| 4,063,240 A | * | 12/1977 | Isbister et al. | 342/107 |
| 4,167,735 A | * | 9/1979 | Lewis | 342/33 |
| 4,224,507 A | * | 9/1980 | Gendreu | 342/80 |
| 4,536,763 A | * | 8/1985 | von Pieverling | 342/107 |
| 5,075,864 A | * | 12/1991 | Sakai | 342/17 |
| 5,307,072 A | * | 4/1994 | Jones, Jr. | 342/147 |
| 5,424,747 A | * | 6/1995 | Chazelas et al. | 342/70 |
| 6,222,481 B1 | * | 4/2001 | Abrahamson et al. | 342/90 |
| 6,753,805 B2 | | 6/2004 | Nakanishi et al. | |
| 6,812,883 B2 | * | 11/2004 | Kumon et al. | 342/70 |
| 7,425,918 B2 | * | 9/2008 | Rastegar et al. | 342/175 |
| 7,482,969 B2 | * | 1/2009 | Huff et al. | 342/118 |
| 7,489,266 B2 | * | 2/2009 | Ohtake et al. | 342/70 |
| 7,532,154 B2 | * | 5/2009 | Noda | 342/133 |
| 7,825,848 B2 | * | 11/2010 | Schoettl | 342/90 |
| 8,120,526 B2 | * | 2/2012 | Holder | 342/146 |
| 8,243,992 B2 | * | 8/2012 | Rouzes et al. | 342/147 |
| 8,248,210 B2 | * | 8/2012 | Nikitin et al. | 342/89 |
| 8,427,364 B1 | * | 4/2013 | Friesel | 342/73 |
| 8,712,612 B2 | * | 4/2014 | Beaurent et al. | 342/44 |
| 8,775,063 B2 | * | 7/2014 | Zeng | 342/90 |
| 8,912,946 B2 | * | 12/2014 | Yanagihara et al. | 342/70 |

* cited by examiner

FIG.3
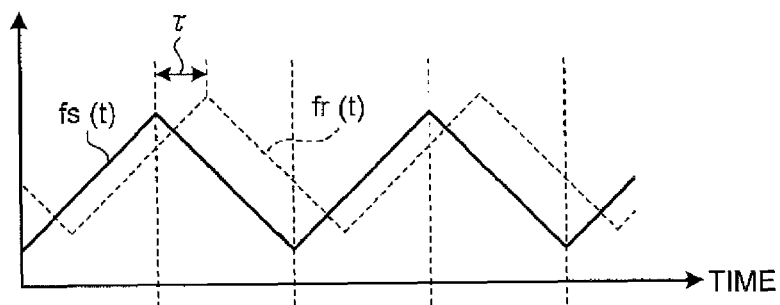
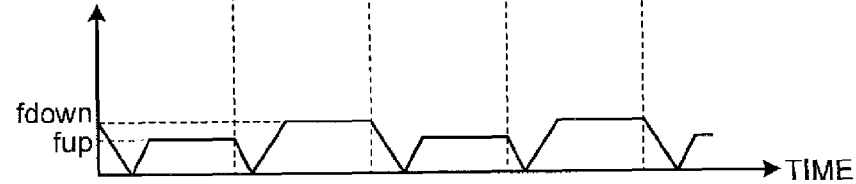
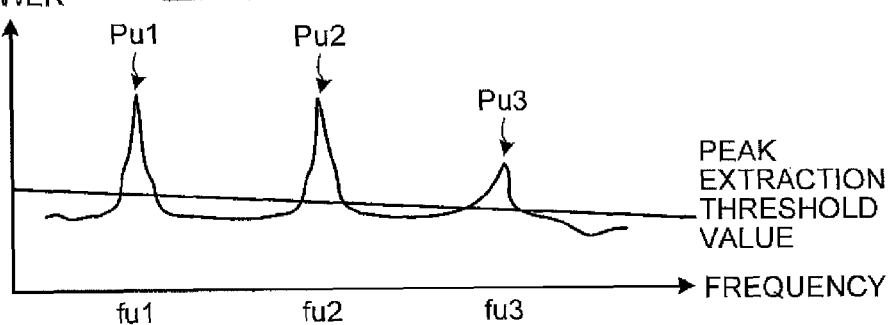
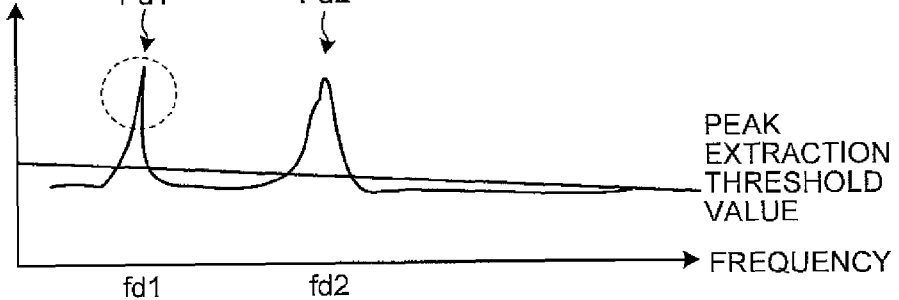

FIG.4
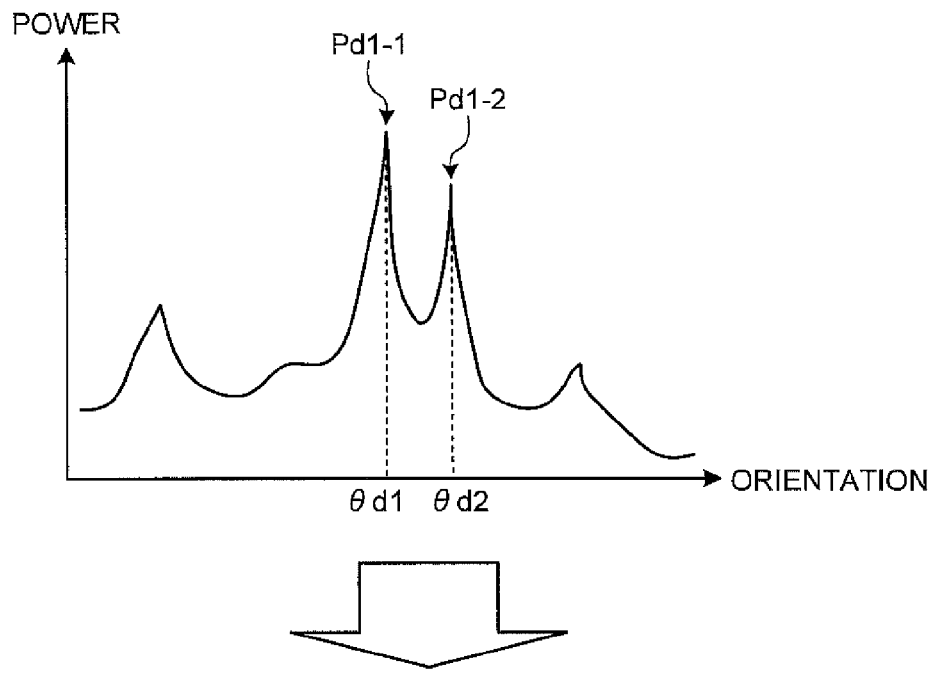
| PEAK | | PEAK FREQUENCY | ORIENTATION | POWER |
|---|---|---|---|---|
| UP FREQUENCY SIDE | Pu1-1 | fu1 | θu1 | PWu1 |
| | Pu1-2 | fu1 | θu2 | PWu2 |
| | Pu2 | fu2 | θu3 | PWu3 |
| | Pu3 | fu3 | θu4 | PWu4 |
| DOWN FREQUENCY SIDE | Pd1-1 | fd1 | θd1 | PWd1 |
| | Pd1-2 | fd1 | θd2 | PWd2 |
| | Pd2 | fd2 | θd3 | PWd3 |
TG1, TG2, TG3
ex) TARGET TG1
| DISTANCE AND RELATIVE SPEED ← fu1, fd1, AND τ ORIENTATION |
|---|
| ORIENTATION ← (θu1+θd2)/2 |

US 9,069,072 B2

RADAR APPARATUS AND TARGET DETECTING METHOD

CROSS-REFERENCE TO RELATED APPLICATION

This application is based upon and claims the benefit of priority of the prior Japanese Patent Application No. 2012-069451, filed on Mar. 26, 2012, the entire contents of which are incorporated herein by reference.

BACKGROUND OF THE INVENTION

1. Field of the Invention

Disclosed embodiments relate to a radar apparatus and a target detecting method.

2. Description of the Related Art

In the related art, there was known a radar apparatus that has an array antenna, estimates an arrival direction of a reflection wave by analyzing the reflection wave received by using the array antenna, and detects a landmark based on the estimated arrival direction (see, for example, Japanese Patent Application Laid-Open No. 2004-108851).

The radar apparatus is used for, for example, a vehicle following system that is mounted on a vehicle and follows an own car to a leading car while detecting the leading car which is precedent to the own car as a landmark (hereinafter, referred to as a "target") which becomes the target on a traffic lane on which the own car travels.

Further, at the time of estimating the arrival direction of the reflection wave as described above, a so called beam scanning type BF (beam forming) method or a method called a null scanning type ESPRIT (estimation of signal parameters via rotational invariance techniques) was generally known.

However, when the related art is used, there was a problem in that false detection of the target easily occurs in the case where a strong reflection-level target (hereinafter, referred to as a "strong reflection object") exists around the target.

For example, when the leading car travels between a large vehicle such as a truck, or a bus which easily becomes the strong reflection object, a reflection wave from the large vehicle largely interferes in a reflection wave from the leading car, and as a result, it was difficult to detect whether there is the leading car.

From this point of view, it becomes a large task how to realize a radar apparatus or a target detecting method that can detect the target with high precision.

SUMMARY OF THE INVENTION

A radar apparatus according to an aspect of an embodiment includes a retrieval unit, an estimation unit, a calculation unit, and a determination unit. The retrieval unit retrieves a strong reflection object based on a signal strength which a frequency spectrum of a beat signal generated by mixing a transmission signal which is frequency-modulated and emitted and a reception signal which is a reflection wave formed in the transmission signal is reflected on a target indicates. The estimation unit estimates an estimation orientation which is an orientation of a target assumed to be present around the strong reflection object, based on a relative distance to the strong reflection object. The calculation unit calculates power which is the signal strength for the estimation orientation by generating an orientation spectrum in the estimation orientation based on a frequency component corresponding to the relative distance. The determination unit determines whether there is the target in the estimation orientation based on the power.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a diagram illustrating a flow up to peak extraction processing in a signal processing device in previous processing of the signal processing device;

FIG. 4 is a diagram illustrating one example of orientation calculation processing and distance/relative speed calculation processing;

DETAILED DESCRIPTION OF THE PREFERRED EMBODIMENT

Hereinafter, with reference to the accompanying drawings, embodiments of a radar apparatus and a target detecting method disclosed in the present invention will be described in detail. Further, the present invention is not limited by embodiments described below.

Further, hereinafter, an overview of a target detecting method according to an embodiment will be described by using FIG. 1 and thereafter, a radar apparatus to which the target detecting method according to the embodiment is applied will be described by using FIGS. 2 to 12.

In addition, in the following description, a case in which the radar apparatus is used in a vehicle following system will be described as an example.

First, the overview of the target detecting method according to the embodiment will be described by using FIG. 1. FIG. 1 is a diagram illustrating an overview of a target detecting method according to an embodiment. Further, an upper part of FIG. 1 schematically illustrates a case in which a three-lane road is viewed from above.

Figure 1:
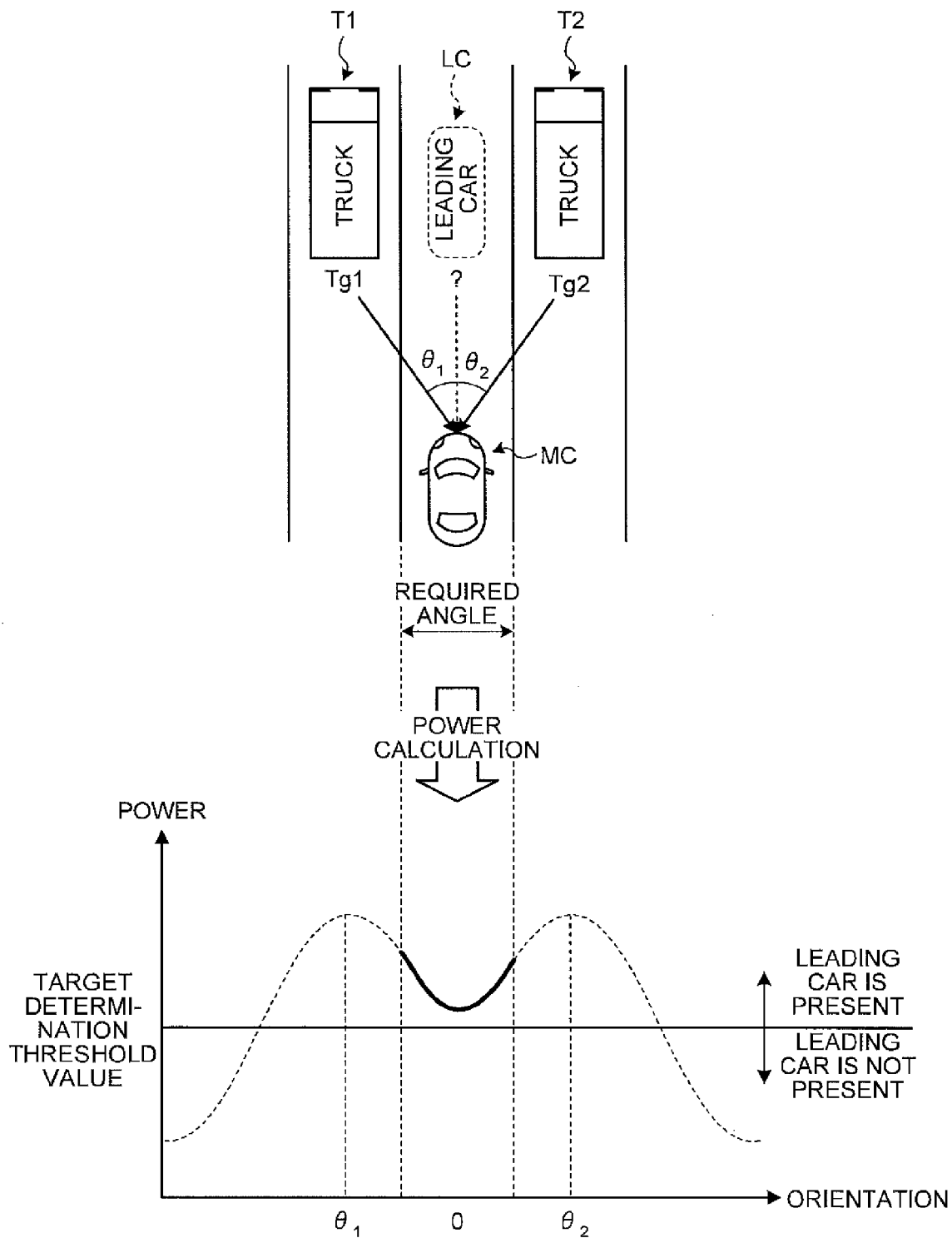
FIG. 1 is a diagram illustrating an overview of a target detecting method according to an embodiment.

As illustrated in FIG. 1, an own car MC travels on a central lane and a truck T1 and a truck T2 travel in front thereof with the central lane between the truck T1 and the truck T2 from the own car MC approximately by the same distance. In addition, herein, it is determined whether there is a leading car LC between the truck T1 and the truck T2.

In this case, according to the target detecting method in the related art, for example, beam scanning is performed by a radar apparatus mounted on the own car MC and a target is detected based on a signal intensity (hereinafter, referred to as "power") of a reflection wave received by the beam scanning.

For example, in a Fourier transformation method, an orientation, a distance, and a relative speed of the target may be acquired by analyzing a peak indicating power having a predetermined value or more in a Fourier transformation result of a transmission wave of which a frequency is modulated and a beat signal of a reflection wave thereof.

Therefore, according to the target detecting method in the related art, the truck T1 and the truck T2, which are the strong reflection object and thus are easily expressed as the peak, are easily detected as a target Tg1 that exists in an orientation $\theta_1$ and a target Tg2 that exists in an orientation $\theta_2$.

However, the reflection waves from the truck T1 and the truck T2 which are the strong reflection object strongly interfere with the leading car LC in a case illustrated in FIG. 1 and thus are difficult to be expressed as the peak and the leading car LC is difficult to be detected as the target (see a mark "?" in the figure). Further, this point indicates the same tendency even when a null scanning type MUSIC (multiple signal classification) method having high resolution or ESPRIT is used.

Therefore, in the target detecting method according to the embodiment, power is calculated by using an arrival direction estimating method of the beam scanning type with respect to a reflection wave of a predetermined orientation, in which it is estimated that the target is present around the strong reflection object when it is considered that there is the strong reflection object. In addition, it is determined whether there is the target according to whether the calculated power is more than a predetermined threshold value.

In detail, as illustrated in FIG. 1, in the target detecting method according to the embodiment, an estimated orientation as an orientation which is not expressed as the peak but in which it is estimated that there is the leading car LC is calculated as a "required angle". Herein, in the case of the vehicle following system, the "required angle" is calculated as large as, for example, a travelling lane of the own car MC. Further, an example of the "required angle" will be described below by using FIGS. 8A to 8C.

Subsequently, as illustrated in FIG. 1, a spectrum corresponding to the "required angle" is generated to perform "power calculation". Herein, the "power calculation" is performed by using Capon method or BF method of a beam scanning type.

The reason is that since the beam scanning type is principally a method of retrieving the target by using a main lobe of an array antenna provided in the radar apparatus, the magnitude (that is, power) of the generated spectrum is apparently proportional to a signal strength of a reflection wave. Therefore, the beam scanning type is suitable for easily determining the threshold value. Further, in the embodiment for the radar apparatus to be described below, a case in which the Capon method is primarily is used will be described as an example.

Further, as illustrated in a solid-line part of the spectrum in the figure, since the spectrum is generated with respect to only the value corresponding to the "required angle", a remaining load is not applied to the entirety of the system by the "power calculation".

In addition, as illustrated in FIG. 1, when the calculated power is more than a "target determination threshold value" which is a predetermined threshold value, it is determined that "there is the leading car LC" and when the calculated power is not more than the "target determination threshold value", it is determined that "there is no leading car LC".

That is, as illustrated in FIG. 1, the target positioned at the "required angle" which is difficult to be expressed as the peak due to an interference of the strong reflection object may be detected according to whether a reflection wave of power having a predetermined value or more, which is expressed by the "target determination threshold value", arrives.

Further, FIG. 1 illustrates the case where the "target determination threshold value" is a predetermined value, but the target determination threshold value is not limited thereto and for example, may be a variable value. The example will be described below by using FIGS. 10A and 10B.

Like this, in the target detecting method according to the embodiment, power is calculated by using the arrival direction estimating method of the beam scanning type with respect to a reflection wave in an estimation orientation, in which it is estimated that the target is present around the strong reflection object when it is considered that there is the strong reflection object.

Further, it is determined whether there is the target according to whether the calculated power is more than a predetermined threshold value. Accordingly, the target may be detected with high precision.

In addition, in the target detecting method according to the embodiment, orientation calculation (hereinafter, may referred to as "base orientation calculation") which becomes a base, including first detection of the strong reflection object itself, is performed by using a high-resolution arrival direction estimating method. In this regard, in an embodiment for the radar apparatus to be described below, a case in which the ESPRIT is primarily is used will be described as an example.

Hereinafter, an embodiment for a radar apparatus to which the target detecting method described by using FIG. 1 is applied will be described in detail.

Figure 2:
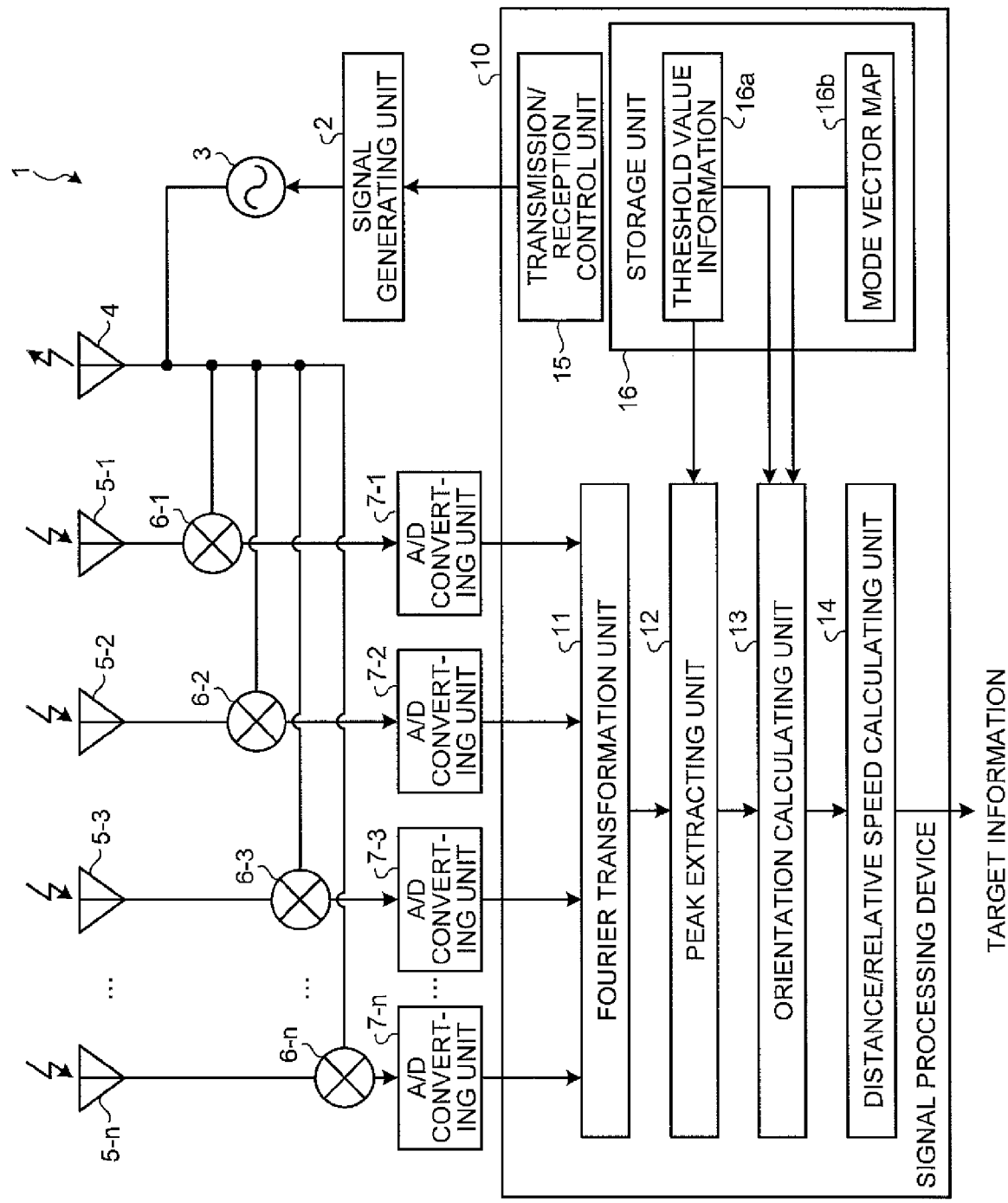
FIG. 2 is a block diagram illustrating a configuration of a radar apparatus according town embodiment.

FIG. 2 is a block diagram illustrating a configuration of a radar apparatus 1 according to the embodiment. Further, in FIG. 2, only a component required to describe a feature of the radar apparatus 1 is illustrated and a description of general components is omitted.

As illustrated in FIG. 2, the radar apparatus 1 includes a signal generating unit 2, an oscillator 3, and a transmission antenna 4 as components constituting a transmission system. Further, the radar apparatus 1 includes reception antennas 5-1 to 5-n, mixers 6-1 to 6-n, A/D converting units 7-1 to 7-n, and a signal processing device 10 as a component constituting a reception system.

In addition, hereinafter, for simple description, when the component is described as a "reception antenna 5", the reception antenna 5 indicates each of the reception antennas 5-1 to 5-n. The same applies to even cases in which the components are respectively described as the "mixer 6" and the "A/D converting unit 7".

The signal generating unit 2 generates a modulation signal for transmitting a millimeter wave frequency-modulated to a triangular wave by control of a transmission/reception control unit 15 which the signal processing device 10 to be described below includes. The oscillator 3 generates a transmission signal based on the modulation signal generated by the signal generating unit 2.

The transmission antenna 4 emits the transmission signal generated by the oscillator 3 in front of the own car MC as a transmission wave (see FIG. 1). Further, as illustrated in FIG. 2, the transmission signal generated by the oscillator 3 is distributed to even the mixer 6 to be described below.

As the transmission wave emitted from the transmission antenna 4 is reflected on the target, the reception antenna 5 receives the reflection wave which arrives from the target as a reception signal. Each mixer 6 mixes the transmission signal distributed as described above and the reception signal received in each reception antenna 5 to generate the beat signal. Further, amplifiers corresponding to the reception antenna 5 and the mixer 6, respectively may be disposed between the reception antenna 5 and the mixer 6.

The A/D converting unit 7 digitally converts the beat signal generated in the mixer 6 and outputs the digitally-converted beat signal to the signal processing device 10.

The signal processing device 10 includes a Fourier transformation unit 11, a peak extracting unit 12, an orientation calculating unit 13, a distance/relative speed calculating unit 14, the transmission/reception control unit 15, and a storage unit 16. The storage unit 16 stores threshold value information 16a and a mode vector map 16b.

The Fourier transformation unit 11 Fourier-transforms the beat signal input from the A/D converting unit 7 and outputs the Fourier-transformed beat signal to the peak extracting unit 12.

The peak extracting unit 12 extracts a peak frequency which becomes a peak in a. Fourier transformation result by the Fourier transformation unit 11 and outputs the extracted peak frequency to the orientation calculating unit 13.

The orientation calculating unit 13 calculates an orientation of each target based on each peak frequency extracted by the peak extracting unit 12 and outputs the calculated orientation to the distance/relative speed calculating unit 14. Further, the orientation calculating unit 13 will be described below in detail by using the figures after FIG. 5.

The distance/relative speed calculating unit 14 calculates a distance and a relative speed of each target based on a calculation result of the orientation calculating unit 13. Further, after calculation, the distance/relative speed calculating unit 14 outputs target information including an orientation, a distance, and a relative speed of each target to be handed over to a unit at a rear stage of the signal processing device 10, and the like.

Herein, a series of basic flows in the signal processing device 10 will be described by using FIGS. 3 and 4. FIG. 3 is a diagram illustrating a flow up to peak extraction processing in the signal processing device 10 in front processing of the signal processing device 10. Further, FIG. 4 is a diagram illustrating one example of orientation calculation processing and distance/relative speed calculation processing.

Further, each of FIGS. 3 and 4 is divided into three regions by two thick downward white arrows and hereinafter, the respective regions will be described as an upper end, a middle end, and a lower end in sequence.

As illustrated on the upper end of FIG. 3, a transmission signal fs(t) is emitted from the transmission antenna 4 as the transmission signal and thereafter, is reflected on the target to arrive as the reflection wave, and received by the reception antenna 5 as a reception signal fr(t).

In this case, as illustrated in the upper end of FIG. 3, the reception signal fr(t) is delayed by a time difference τ with respect to the transmission signal fs(t) according to a distance between the own car MC and the target. By a Doppler effect based on the time difference τ, and the own car MC and the relative speed of the target, in an output signal acquired by mixing the reception signal fr(t) and the transmission signal fs(t) with each other, a beat signal in which an UP frequency fup and a DOWN frequency fdown are repeated is acquired (see the middle end of FIG. 3).

The lower end of FIG. 3 schematically illustrates the result acquired by Fourier-transforming the beat signal in the Fourier transformation unit 11 with respect to each of the UP frequency fup side and the DOWN frequency fdown side.

As illustrated in the lower end of FIG. 3, waveforms in respective frequency regions of the UP frequency fup and the DOWN frequency fdown are acquired after Fourier transformation. Further, the peak extracting unit 12 extracts a peak frequency which becomes the peak in the waveform.

For example, in the case of the example illustrated in the lower end of FIG. 3, a peak extraction threshold value is used and in the UP frequency fup side, peaks Put to Pu3 are determined as the peak, respectively, and as a result, peak frequencies fu1 to fu3 are extracted, respectively.

Further, in the DOWN frequency fdown side, peaks Pd1 and Pd2 are determined as the peak, respectively, and as a result, peak frequencies fd1 and fd2 are extracted, respectively. In addition, the peak extraction threshold value may be, in advance, stored in the threshold value information 16a to be described below.

Herein, reflection waves from a plurality of targets may be mixed in a frequency component of each peak frequency extracted by the peak extracting unit 12. Therefore, the orientation calculating unit 13 performs orientation calculation (for example, spectrum generation, and the like) with respect to the respective peak frequencies to analyze the existence of the target for each peak frequency in detail.

Further, a method of the analysis is not particularly limited. When the spectrum generation is performed, a known BF method, and the like may be used. In addition, in the embodiment, the ESPRIT is used in the orientation calculation which becomes the base, but this point will be described below in detail.

In regard to this analysis, an upper end of FIG. 4 illustrates a case in which spectrum generation is performed with respect to the peak Pd1 surrounded by a dotted closed curve in the lower end of FIG. 3.

As illustrated in the upper end of FIG. 4, for example, the peak Pd1 is spectrum-generated and thus may be divided into two peaks of a peak Pd1-1 and a peak Pd1-2. Further, orientations θd1 and θd2 are acquired with respect to the peaks Pd1-1 and Pd1-2, respectively. The same applies to all peak frequencies illustrated in the lower end of FIG. 3.

Therefore, when the spectrum generation is performed with respect to all of the peak frequencies of the UP frequency fup side and the DOWN frequency fdown side, for example, the peak frequency, the orientation, and the power are deduced for each peak as illustrated in the middle end of FIG. 4.

The orientation calculating unit 13 performs pairing rubbed in the UP frequency fup side and the DOWN frequency fdown side based on a coincidence degree of the peak frequency, the orientation, and the power for each peak which is deduced. By the pairing, for example, a target TG1, a target TG2, and a target TG3 are detected as illustrated in the middle end of FIG. 4.

Further, as illustrated in the lower end of FIG. 4, the distance/relative speed calculating unit 14 calculates the distance and the relative speed from the peak frequencies fu1 and fd1, and the time difference τ, and the like with respect to, for example, the target TG1. In addition, for example, an average value of the orientations is acquired from $(\theta u1+\theta d2)/2$.

Figure 5:
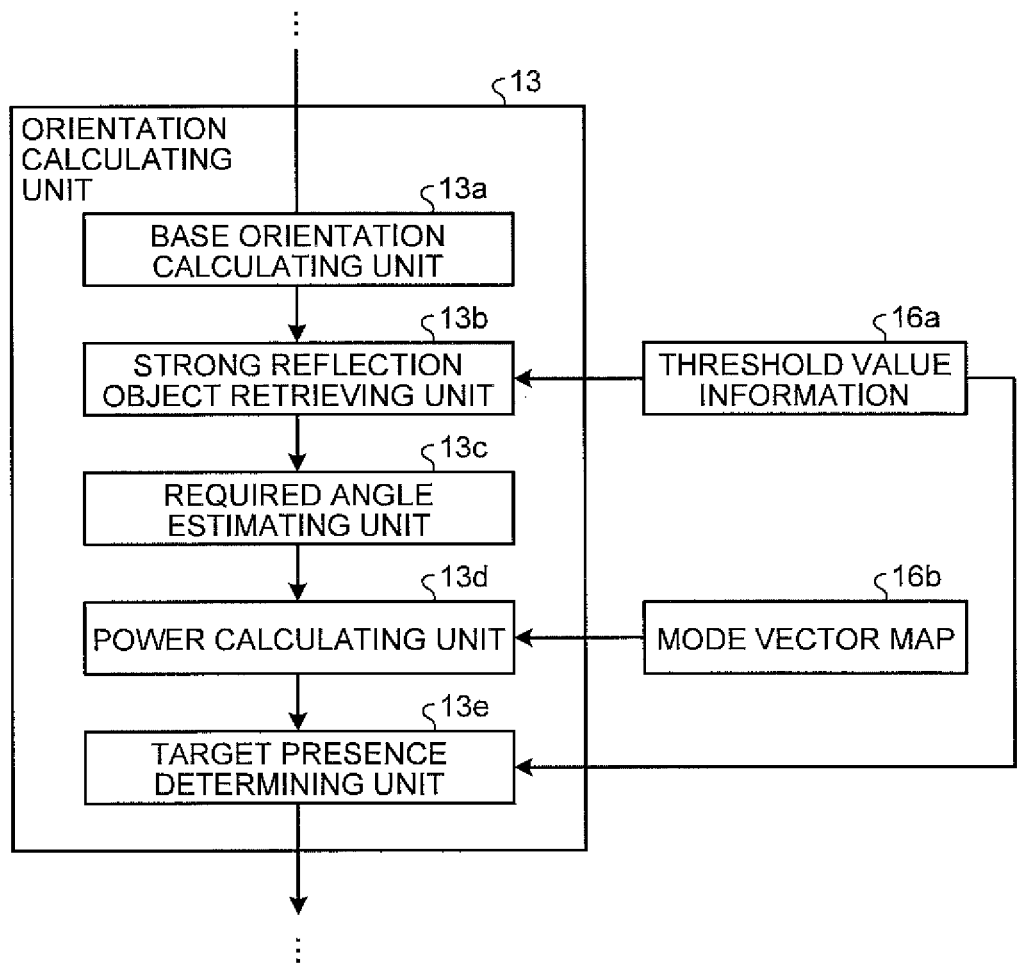
FIG. 5 is a block diagram illustrating a configuration of an orientation calculating unit.

As a premise of the basic flow described up to now, the orientation calculating unit 13 of the signal processing device 10 according to the embodiment will be described in detail. FIG. 5 is a block diagram illustrating a configuration of the orientation calculating unit 13.

As illustrated in FIG. 5, the orientation calculating unit 13 includes a base orientation calculating unit 13a, a strong reflection object retrieving unit 13b, a required angle estimating unit 13c, a power calculating unit 13d, and a target presence determining unit 13e.

The base orientation calculating unit 13a performs orientation calculation which becomes a base, including the strong reflection object itself, based on the extraction result of the peak extracting unit 12. Further, the base orientation calculating unit 13a outputs the orientation of each target, which is acquired through calculation, to the strong reflection object retrieving unit 13b together with the extraction result of the peak extracting unit 12. In addition, in the orientation calculation of the base orientation calculating unit 13a, the method is not particularly limited, but preferably has high resolution because the strong reflection object itself needs to be detected with high precision.

Figure 6:
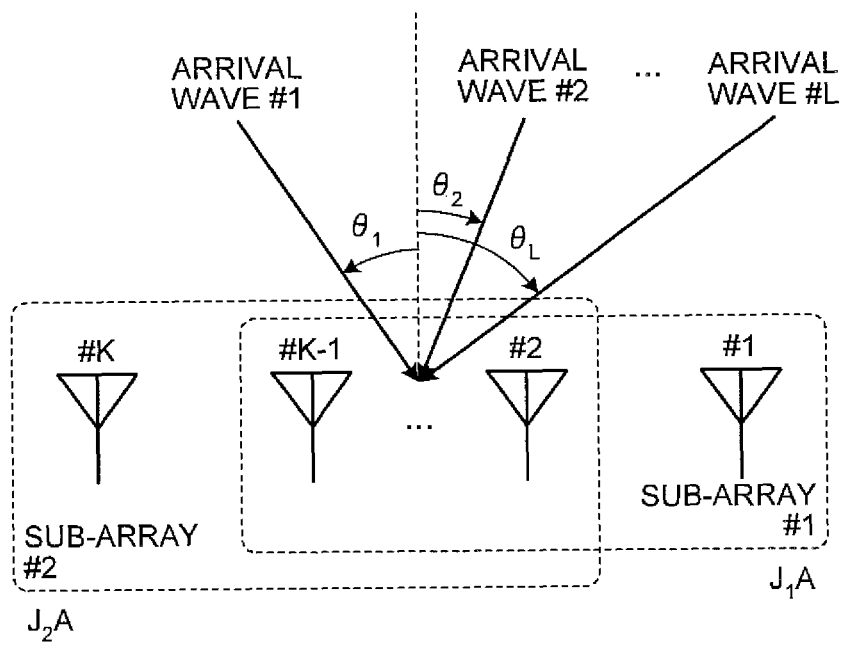
FIG. 6 is a diagram illustrating an overview of ESPRIT.

Therefore, the base orientation calculating unit 13a performs orientation calculation using the ESPRIT. Herein, although known above, the ESPRIT will be described by using FIG. 6. FIG. 6 is a diagram illustrating an overview of the ESPRIT.

The ESPRIT is a method of estimating an arrival direction of an arrival wave (that is, the reflection wave) from a phase difference between two sub-arrays by dividing the reception antenna 5 into two sub-arrays which deviate from each other.

As illustrated in FIG. 6, a linear array of a K element is assumed. Further, as illustrated in FIG. 6, an arrival wave-number is referred to as L and an orientation of an i-th arrival wave is referred to as $\theta_i$ (i=1, 2, ..., L).

Herein, in the ESPRIT, phase rotation of each arrival wave caused by parallel movement of all of the arrays is estimated, based on rotational invariance "$J_1 A\phi = J_2 A$". A matrix $J_1$ and a matrix $J_2$ are transformation matrixes of (K−1)×K, A is a direction matrix constituted by array response vectors using $\theta_1$ to $\theta_1$, as variables, and $\phi$ is an L-th order diagonal matrix.

As illustrated in FIG. 6, in the linear array of the K element, when a first element to a (K−1)-th element are set as a sub-array #1 and a second element to a K-th element is set as a sub-array #2, $J_1 A$ and $J_2 A$ of the rotational invariance mean operations of extracting first to (K−1)-th rows and second to K-th rows of the matrix A, respectively. That is, as illustrated in FIG. 6, $J_1 A$ and $J_2 A$ represent the direction matrixes of the sub-array #1 and the sub-array #2, respectively.

Herein, when A has been already known, an arrival angle of a path may be estimated by acquiring $\phi$, but since A needs to be estimated, $\phi$ may not be directly acquired. Therefore, after a K×K covariance matrix $R_{xx}$ of a K-dimension reception signal vector is acquired, a signal subspace matrix $E_s$ is generated by using an eigenvector corresponding to an eigenvalue which is larger than thermal noise power $\sigma^2$, from an eigenvalue acquired by eigenvalue-expanding the $R_{xx}$.

The generated signal subspace matrix Es and the matrix A may be expressed as $A = E_s T^{-1}$ by using an L-th order regular matrix T, which uniquely exists between both sides. Herein, $E_s$ represents a K×L matrix and T represents the regular matrix of L×L. Accordingly, when $E_s$ and T are substituted into the rotational invariance, $(J_1 E_s)(T\phi T^{-1}) = J_2 E_s$ is acquired. In the above equation, when $T\phi T^{-1}$ is acquired and eigenvalue-expanded, an eigenvalue thereof becomes a diagonal component of $\phi$. Accordingly, an orientation of an arrival wave may be estimated from the eigenvalue.

Further, like this, since the ESPRIT does not require information on the array response vector, calibration of the array antenna becomes unnecessary and a retrieving operation such as peak retrieval in a spectrum becomes unnecessary.

Referring back to FIG. 5, the strong reflection object retrieving unit 13b will be described. The strong reflection object retrieving unit 13b determines whether the power is more than a predetermined strong reflection object threshold value by referring to the power in the Fourier transformation result by the Fourier transformation unit 11 with respect to the orientation of each target which is handed over from the base orientation calculating unit 13a. Further, the strong reflection object retrieving unit 13b determines that the target having the power which is more than the strong reflection object threshold value is the strong reflection object.

Figure 7:
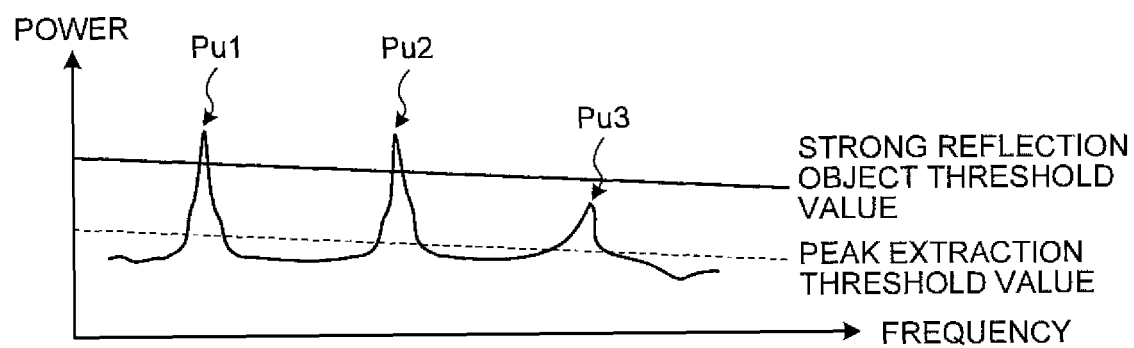
FIG. 7 is a processing explanatory diagram of strong reflection object retrieval processing.

Herein, the storing reflection object retrieval processing will be described by using FIG. 7. FIG. 7 is a processing explanatory diagram of the strong reflection object retrieval processing. A Fourier transformation result illustrated in FIG. 7 is obtained and three targets corresponding to the peaks Pu1 to Pu3 are detected from the peak extracting unit 12 through the base orientation calculating unit 13a.

In this case, the strong reflection object retrieving unit 13b regards the targets corresponding to the peaks Pu1 and Pu2 which are larger than the strong reflection object threshold value as the strong reflection object and does not regard the target corresponding to the peak Pu3 as the strong reflection object. Further, when the strong reflection object retrieving unit 13b does not regard all targets as the strong reflection object, calculation associated with the strong reflection object is not performed but the control is performed in the distance/relative speed calculating unit 14.

Herein, a Fourier transformation result to which the strong reflection object retrieving unit 13b refers may be stored in the storage unit 16 by the Fourier transformation unit 11 or turned over through the peak extracting unit 12 and the base orientation calculating unit 13a.

Further, a strong reflection object threshold value used by the strong reflection object retrieving unit 13b is stored in the threshold value information 16a in advance.

In addition, the strong reflection object retrieving unit 13b may retrieve not the strong reflection object itself but a distance in which a plurality of strong reflection objects is present.

Referring back to FIG. 5, the required angle estimating unit 13c will be described. The required angle estimating unit 13c estimates a required angle required with respect to the orientation or the distance of the storing reflection object detected in the strong reflection object retrieving unit 13b. The required angle may be based on a purpose of the system where the radar apparatus 1 is used.

Figure 8A:
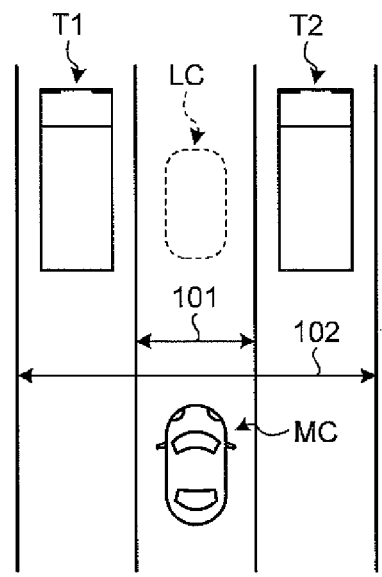
FIGS. 8A to 8C are diagrams (the 1) to (the 3) illustrating one example of a required angle.
Figure 8B:
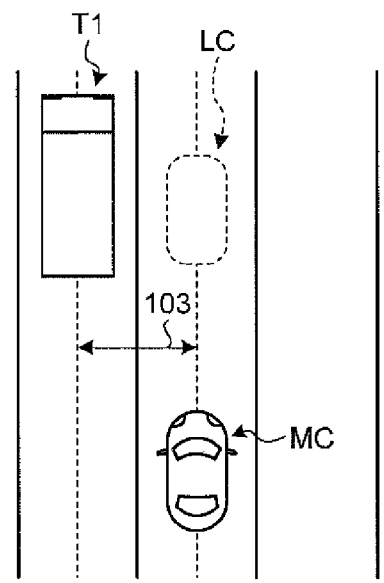
Figure 8C:
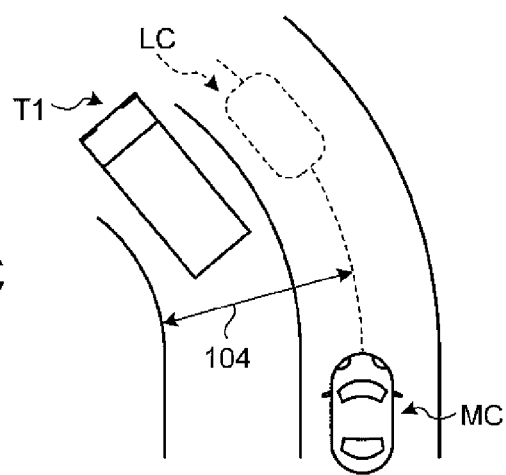

Herein, one example of the required angle will be described by using FIGS. 8A to 8C. FIGS. 8A to 8C are diagrams examples of required angles, respectively.

As illustrated in FIG. 8A, the own car MC travels on a central lane of the three-lane road and travels in front thereof with the central lane between the truck T1 and the truck T2 from the own car MC approximately by the same distance.

Herein, when it is determined whether there is the leading car LC between the truck T1 and the truck T2, the required angle may be as large as, for example, travelling lane of the own car MC indicated by a bidirectional arrow 101. This is suitable for the case in which the radar apparatus 1 is used in the vehicle following system. Further, the required angle may be within a range indicated by a bidirectional arrow 102 considering even both adjacent lanes.

Further, as illustrated in FIG. 8B, the truck T1 travels on a lane adjacent to the lane on which the own car MC travels. Herein, when it is determined whether there is the leading car LC around the truck T1, the required angle may be within a range offset by one lane from, for example, a central portion of the adjacent lane indicated by a bidirectional arrow 103.

Further, as illustrated in FIG. 8C, the truck T1 travels on the lane adjacent to the lane on which the own car MC travels and a road curves. Herein, when it is determined whether there is the leading car LC around the truck T1, the required angle may be adjusted as, for example, a range indicated by a bidirectional arrow 104 according to a rudder angle or a yaw rate of the own car MC.

Like this, the required angle may be based on a travelling condition of the own car MC or a road condition.

Referring back to FIG. 5, the power calculating unit 13d will be described. The power calculating unit 13d calculates power corresponding to the required angle estimated by the required angle estimating unit 13c. In the embodiment, a Capon method is used for the power calculation.

Figure 9:
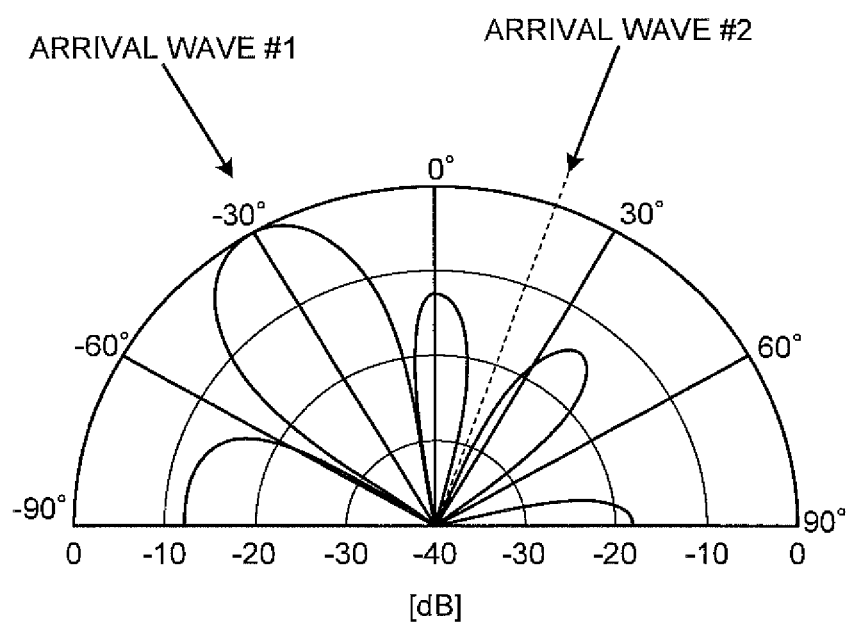
FIG. 9 is a diagram illustrating a feature of a directional pattern of Capon method.

Herein, although already known, the Capon method will be described by using FIG. 9. FIG. 9 is a diagram illustrating a feature of a directional pattern of a Capon method.

First, a BF method will be described before describing the Capon method. The BF method is the most basic arrival direction estimating method and like a name thereof, the BF method is a method of finding a direction in which output power of the array is increased by scanning a main lobe of a uniform array antenna in all directions.

However, the BF method is convenient, but when the main lobe is made to face a direction of a predetermined wave, a directional side lobe may also receive other waves. Therefore, the Capon method is contrived to minimize a contribution to an output from another direction while making the main lobe face a predetermined direction.

In detail, as illustrated in FIG. 9, when the main lobe is made to face an arrival wave #1, a 0 point or a low-sensitivity part (that is, null) between lobes is made to face an arrival wave #2 which is another wave.

This is a way of thinking of so called DCMP (directional constrained minimization of power) to which a directional constraint is applied.

Therefore, the linear array of the K element in the case of FIG. 6 which has already been illustrated is assumed, and when a weight vector having a weight component is represented by W in the case where a weight of each element is set from a common phase condition (a condition having a phase to acquire the same phase), a problem may be formulated as represented in Equation (1) below.

[Equation 1]

$$\min_{W}\left(P_{out} = \frac{1}{2}W^H R_{xx} W\right) \text{ subject to } W^H a(\theta) = 1 \quad (1)$$

Further, an upper additional superscript H represents a complex conjugate transposition. In addition, $R_{xx}$ represents a correlation matrix of an input, that is, the covariance matrix illustrated in the description of the ESPRIT. Furthermore, $a(\theta)$ has a congruence relationship with W and is generally called a "mode vector".

A conditionally applied minimization problem represented in Equation (1) may be solved by using a Lagrange multiplier. That is, an optimal weight is deduced by Equation (2) below.

[Equation 2]

$$W_{Capon} = \frac{R_{xx}^{-1} a(\theta)}{a^H(\theta) R_{xx}^{-1} a(\theta)} \quad (2)$$

Array output power at this time is represented by Equation (3) below.

[Equation 3]

$$P_{out} = \frac{1}{2} W_{Capon}^H R_{xx} W_{Capon} = \frac{1}{2a^H(\theta) R_{xx}^{-1} a(\theta)} \quad (3)$$

Further, a spectrum of the Capon method is generally acquired in the form of Equation (4) below by removing a determined coefficient of output power.

[Equation 4]

$$P_{Capon}(\theta) = 2P_{out} = \frac{1}{a^H(\theta) R_{xx}^{-1} a(\theta)} \quad (4)$$

In addition, the aforementioned mode vector is, in advance, stored in the mode vector map 16b as map information and the power calculating unit 13d performs calculation while substituting a map value of the mode vector map 16b into $a(\theta)$.

Referring back to FIG. 5, the target presence determining unit 13e will be described. The target presence determining unit 13e determines whether the power corresponding to the required angle estimated by the power calculating unit 13d is more than a target determination threshold value.

Further, when the power corresponding to the required angle is more than the target determination threshold value, it is determined that there is the target in a predetermined orientation (that is, an estimated orientation) indicated by the required angle. In addition, when the power is not more than the target determination threshold value, it is determined that there is no target in the predetermined orientation indicated by the required angle.

Further, the target presence determining unit 13e outputs the determination result to the distance/relative speed calculating unit 14.

In addition, the target determination threshold value is, in advance, stored in the threshold value information 16a. Herein, the target determination threshold value is not limited to a predetermined value (see FIG. 1) and may be a variable value. Herein, the example will be described below by using FIGS. 10A and 10B.

Figure 10A:
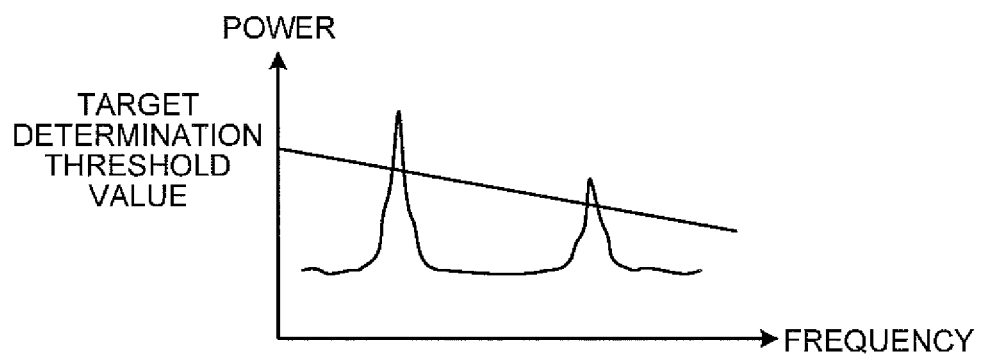
FIGS. 10A and 10B are diagrams (the 1) and (the 2) illustrating one example of a target determination threshold value.
Figure 10B:
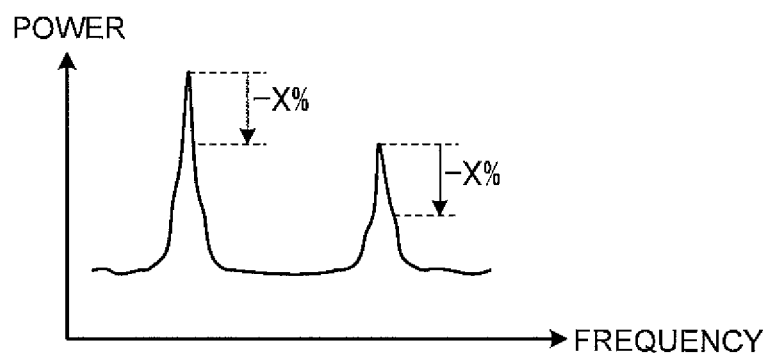

FIGS. 10A and 10B are diagrams illustrating one example of a target determination threshold value. First, the target determination threshold value may vary according to the distance of the target. In this case, for example, as illustrated in FIG. 10A, the target determination threshold value may be set to the downside to correspond to a frequency which increases as the distance from the target increases.

Further, for example, as illustrated in FIG. 10B, the target determination threshold value may be set as a relative value from a reference value like a value acquired by subtracting "–X %" from the power at the peak in the Fourier transformation result.

Herein, the determination example in the target presence determining unit 13e for each of several traveling conditions of the own car MC as an example will be described by using FIGS. 11A to 11D. FIGS. 11A to 11D are diagrams illustrating respective determination examples in the target presence determining unit 13e.

Further, the own car MC travels on the center lane of the three-lane road and the required angle refers to only 0°. In addition, for easy description, the spectrum is illustrated, which includes up to both adjacent lanes.

Figure 11A:
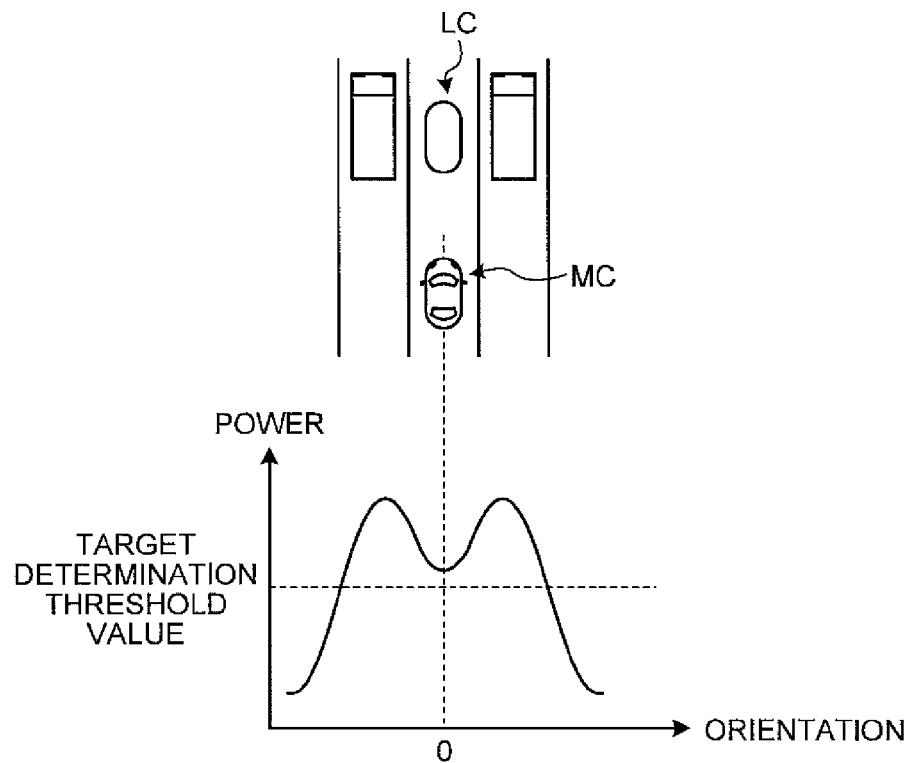
FIGS. 11A to 11D are diagrams (the 1) to (the 4) illustrating a determination example in a target presence determining unit.

As illustrated in FIG. 11A, when three cars travel in parallel in front of the own car MC, that is, when the leading car LC on the same lane as the own car MC and two strong reflection cars on left and right adjacent lanes thereof travel in parallel, the magnitude of the spectrum at the required angle of 0°, that is, the power is more than the target determination threshold value according to the target detecting method described up to now.

Accordingly, in this case, the target presence determining unit 13e determines that there is the leading car LC. Further, the orientation calculating unit 13 outputs the required angle of 0° to the distance/relative speed calculating unit 14 together with the orientation of each target which becomes the base, which is calculated by the base orientation calculating unit 13a.

Figure 11B:
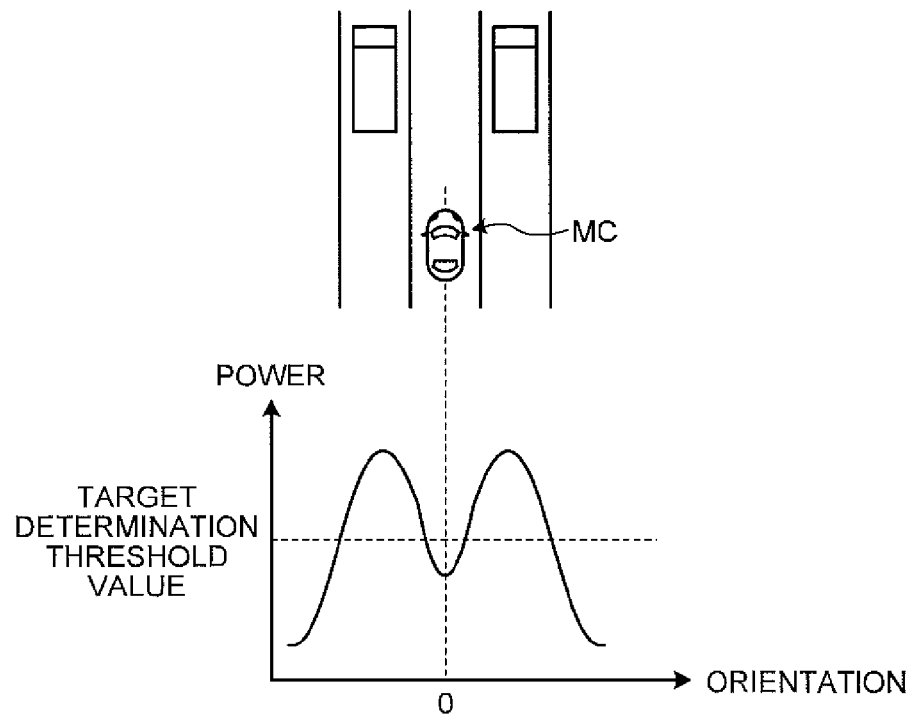

Further, as illustrated in FIG. 11B, two strong reflection cars travel in parallel on the left and right adjacent lanes in front of the own car MC, but when there is no leading car LC, the power at the required angle of 0° is not more than the target determination threshold value according to the target detecting method described up to now.

Accordingly, in this case, the target presence determining unit 13e determines that there is no leading car LC. Further, the orientation calculating unit 13 outputs only the orientation of each target calculated by the base orientation calculating unit 13a to the distance•relative speed calculating unit 14.

Figure 11C:
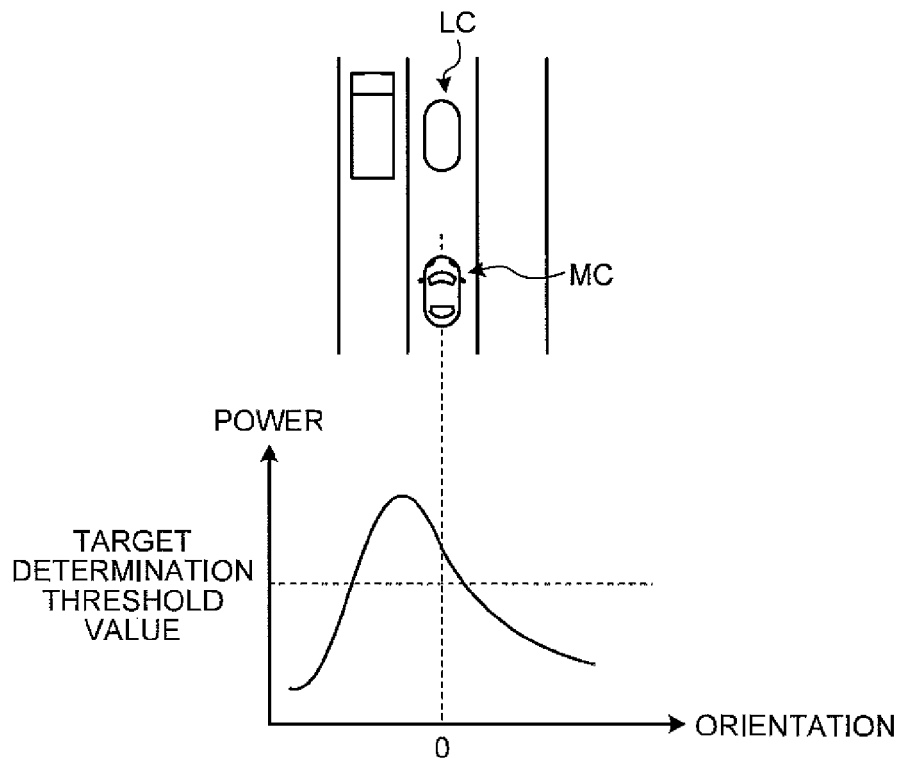

Further, as illustrated in FIG. 11C, two cars travel in parallel in front of the own car MC, and when one of the two cars is the leading car LC and the other one is a strong reflection car on an adjacent lane, the power at the required angle of 0° is more than the target determination threshold value according to the target detecting method described up to now.

Therefore, in this case, the target presence determining unit 13e determines that there is the leading car LC. Further, the required angle of 0° is output to the distance•relative speed calculating unit 14 together with the orientation of each target which becomes the base, which is calculated by the base orientation calculating unit 13a.

Figure 11D:
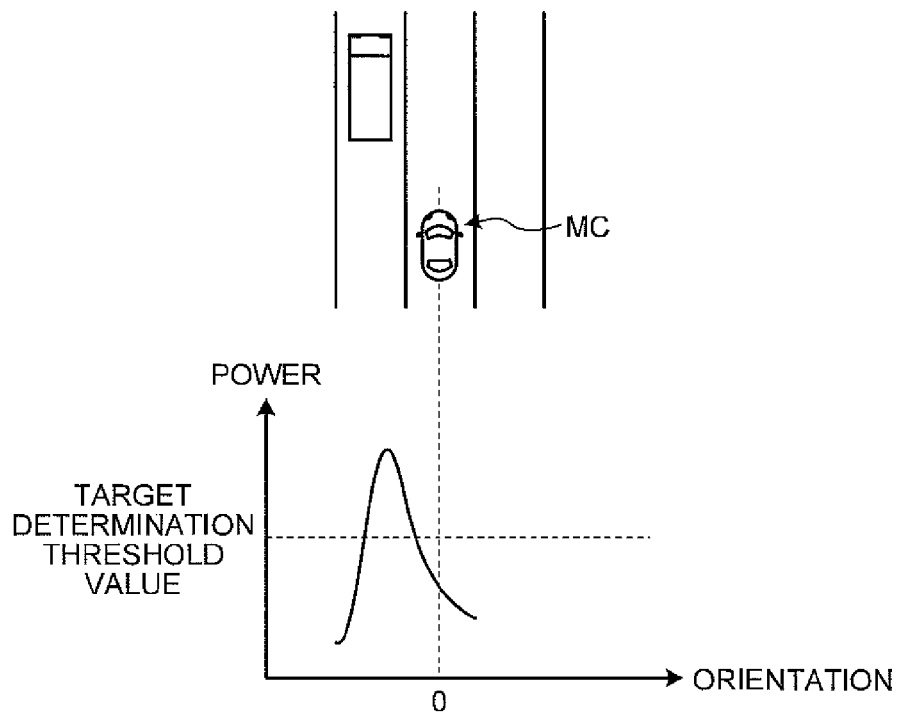

Further, as illustrated in FIG. 11D, the strong reflection car travels on the adjacent lane in front of the own car MC, but when there is no leading car LC, the power at the required angle of 0° is not more than the target determination threshold value according to the target detecting method described up to now.

Therefore, in this case, the target presence determining unit 13e determines that there is no leading car LC. Further, the orientation calculating unit 13 outputs only the orientation of each target calculated by the base orientation calculating unit 13a to the distance•relative speed calculating unit 14. In addition, by an extension degree of the range of the required angle, it is needless to say that it is determined that there is the leading car LC in this case.

Referring back to FIG. 2, the transmission/reception control unit 15 will be described. The transmission/reception control unit 15 controls the signal generating unit 2. Further, although not illustrated, controlling each processing unit in a reception system is also performed simultaneously.

The storage unit 16 is a storage unit constituted by a storage device such as a hard disk drive, nonvolatile memory, or a register and stores the threshold value information 16a and the mode vector map 16b.

The threshold value information 16a and the mode vector map 16b have already been described and thus will not be described herein.

Figure 12:
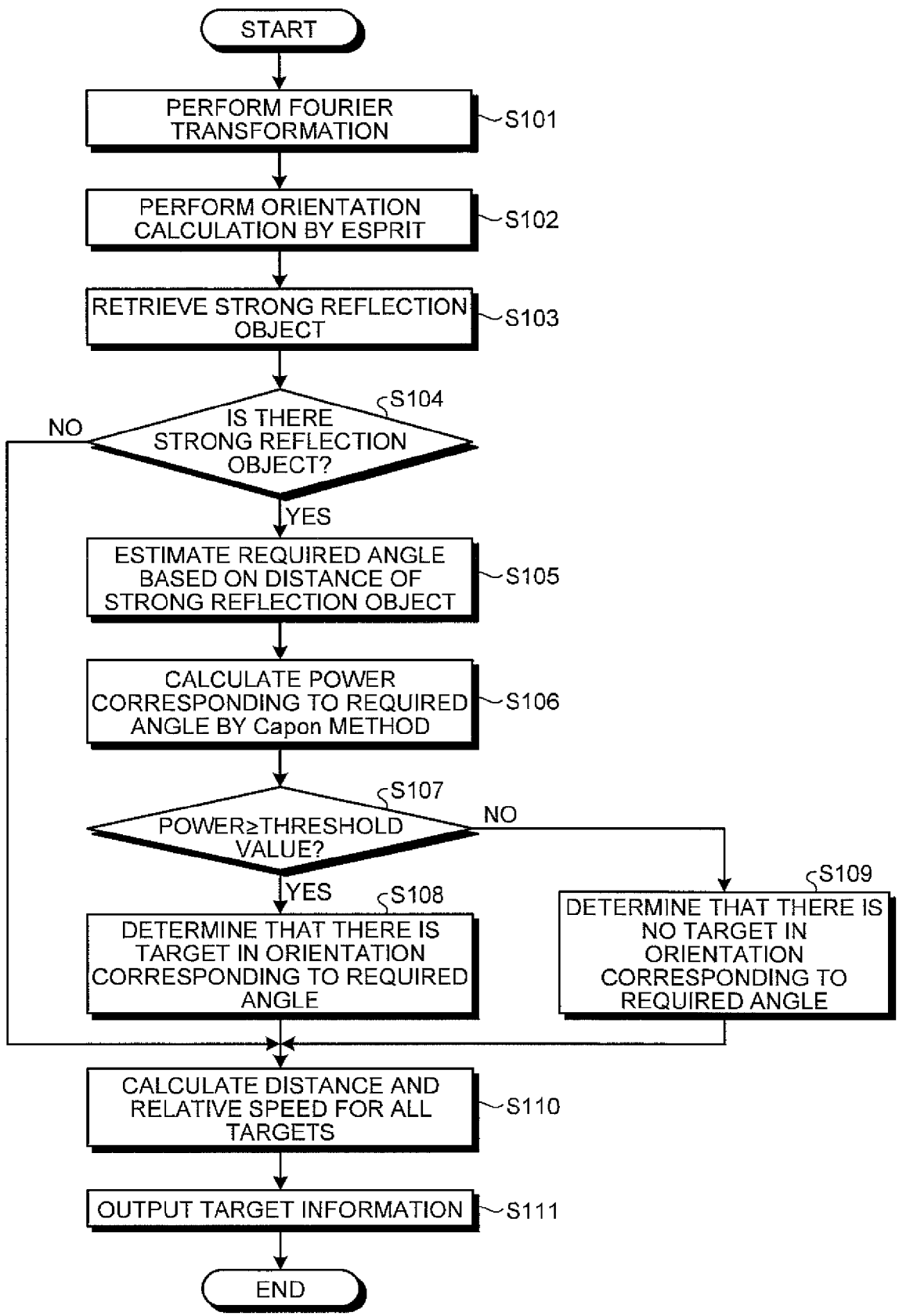
FIG. 12 is a flowchart illustrating a processing procedure executed by the signal processing device.

Next, a processing procedure executed by the radar apparatus 1 according to the embodiment will be described. Further, herein, only a processing procedure executed by the signal processing device 10 of the radar apparatus 1 will be described and processing procedures of other components are similar as those of the related art and thus will not be described. FIG. 12 is a flowchart illustrating the processing procedure executed by the signal processing device 10.

As illustrated in FIG. 12, first, the Fourier transformation unit 11 performs Fourier transformation of a beat signal input from the A/D converting unit 7 (step S101).

Further, although not illustrated, a peak frequency at which an amplitude or power of a Fourier transformation result in the Fourier transformation unit 11 is at the peak is extracted by the peak extracting unit 12. In addition, the base orientation calculating unit 13a performs orientation calculation by the ESPRIT based on an extraction result of the peak extracting unit 12 (step S102).

Further, the strong reflection object retrieving unit 13b retrieves the strong reflection object with respect to each of the orientations calculated by the base orientation calculating unit 13a (step S103). As a result of the retrieval, when there is the strong reflection object (step S104, Yes), the required angle estimating unit 13c estimates the required angle based on the distance of the strong reflection object (step S105). In addition, when there is no strong reflection object (step S104, No), the control proceeds to processing of step S110.

Further, the power calculating unit 13d calculates power corresponding to the required angle by the Capon method (step S106).

In addition, the target presence determining unit 13e determines whether the calculated power is equal to or more than a threshold value (that is, the target determination threshold value) (step S107). Herein, when a determination condition of step S107 is satisfied (step S107, Yes), the target presence determining unit 13e determines that the target is present in the orientation corresponding to the required angle (step S108).

Further, when the determination condition of step S107 is not satisfied (step S107, No), the target presence determining unit 13e determines that the target is not present in the orientation corresponding to the required angle (step S109).

Further, the distance•relative speed calculating unit 14 calculates the distances and the relative speeds for all targets including the target detected in the base orientation calculating unit 13a and the target determined in the target presence determining unit 13e (step S110). In addition, as necessary, for example, the distance and the relative speed of only the target may be calculated.

Further, the distance•relative speed calculating unit 14 outputs target information including an orientation, a distance, and a relative speed of each target, which are calculated, to a unit at a rear stage of the signal processing device 10, and the like (step S111), and terminates the processing.

As described above, in the embodiment, the radar apparatus is configured in such a manner that the strong reflection object retrieving unit retrieves the strong reflection object indicating the target that causes the reflection wave to arrive with a signal strength having a predetermined value or more based on a signal strength which a frequency spectrum of a beat signal generated by mixing a reception signal and a transmission signal indicates, the required angle estimating unit estimates an estimation orientation which is an orientation of a target assumed to be present around the strong reflection object based on the relative distance to the strong reflection object, and the power calculating unit generates an orientation spectrum in the estimation orientation based on the frequency component corresponding to the relative distance to calculate power which is a signal strength for the estimation orientation, and the target presence determining unit determines whether the target is present in the estimation orientation based on the power. Accordingly, the target may be detected with high precision.

Further, in the embodiment, the case in which the base orientation calculating unit uses the ESPRIT has been described, but the arrival direction estimating method is not limited. Accordingly, a maximum entropy method, a LP (linear prediction) method, a minimum norm method, or the like may be used.

Further, in the embodiment, the case in which the base orientation calculating unit performs orientation calculation, which becomes the base, estimates the required angle based on the orientation which becomes the base, and calculates the power corresponding to the required angle has been described, but the orientation calculation which becomes the base need not be performed.

For example, the power may be calculated after retrieving the strong reflection object based on only the Fourier transformation result of the Fourier transformation unit and the extraction result of the peak extracting unit. Further, in this case, securing the detection precision of the target, such as widening the range of the required angle is preferably performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

As described above, the radar apparatus and the target detecting method according to the present invention is useful in detecting a target with high precision, and is especially suited for the application to a radar apparatus for vehicle installation that high detection precision is found although reception environment is easy to increase a limit.

What is claimed is:

1. A radar apparatus, comprising:
   a retrieval unit that retrieves a strong reflection object based on a signal strength which a frequency spectrum of a beat signal generated by mixing a transmission signal which is frequency-modulated and emitted and a reception signal which is a reflection wave formed in the transmission signal is reflected on a target indicates;
   an estimation unit that estimates an estimation orientation which is an orientation of a target assumed to be present around the strong reflection object, based on a relative distance to the strong reflection object;
   a calculation unit that calculates power which is the signal strength for the estimation orientation by generating an orientation spectrum in the estimation orientation based on a frequency component corresponding to the relative distance; and
   a determination unit that determines whether there is the target in the estimation orientation based on the power.

2. The radar apparatus according to claim 1, wherein the calculation unit generates the orientation spectrum by using an arrival direction estimating method of a beam scanning type.

3. The radar apparatus according to claim 2, wherein the determination unit determines that there is the target in the estimation orientation when the power is equal to or more than a predetermined threshold value and determines that there is no target in the estimation orientation when the power is less than the threshold value.

4. The radar apparatus according to claim 3, wherein the determination unit uses the threshold value, which is set in advance, so as to vary according to the relative distance to the target.

5. The radar apparatus according to claims 4, wherein:
   the radar apparatus is mounted on a vehicle, and
   the estimation unit estimates an orientation corresponding to a width of a lane on which the vehicle travels as the estimation orientation.

6. The radar apparatus according to claim 5, wherein the estimation unit adjusts the estimation orientation according to a rudder angle and a yaw rate of the vehicle.

7. The radar apparatus according to claims 3, wherein:
   the radar apparatus is mounted on a vehicle, and
   the estimation unit estimates an orientation corresponding to a width of a lane on which the vehicle travels as the estimation orientation.

8. The radar apparatus according to claim 7, wherein the estimation unit adjusts the estimation orientation according to a rudder angle and a yaw rate of the vehicle.

9. The radar apparatus according to claims 2, wherein:
   the radar apparatus is mounted on a vehicle, and
   the estimation unit estimates an orientation corresponding to a width of a lane on which the vehicle travels as the estimation orientation.

10. The radar apparatus according to claim 9, wherein the estimation unit adjusts the estimation orientation according to a rudder angle and a yaw rate of the vehicle.

11. The radar apparatus according to claims 1, wherein:
    the radar apparatus is mounted on a vehicle, and
    the estimation unit estimates an orientation corresponding to a width of a lane on which the vehicle travels as the estimation orientation.

12. The radar apparatus according to claim 11, wherein the estimation unit adjusts the estimation orientation according to a rudder angle and a yaw rate of the vehicle.

13. A target detecting method, comprising:
    receiving a reflection wave which arrives as a transmission signal which is frequency-modulated and emitted as a reception signal;
    retrieving a strong reflection object based on a signal strength indicated by a frequency spectrum of a beat signal generated by mixing the reception signal and the transmission signal;
    estimating an estimation orientation which is an orientation of a target assumed to be present around the strong reflection object, based on a relative distance to the strong reflection object;
    calculating power which is the signal strength for the estimation orientation by generating an orientation spectrum in the estimation orientation based on a frequency component corresponding to the relative distance; and
    determining whether there is the target which becomes a target in the estimation orientation based on the power.

14. A radar apparatus, comprising:
    a retrieval means that retrieves a strong reflection object based on a signal strength which a frequency spectrum of a beat signal generated by mixing a transmission signal which is frequency-modulated and emitted and a reception signal which is a reflection wave formed in the transmission signal is reflected on a target indicates;
    an estimation means that estimates an estimation orientation which is an orientation of a target assumed to be present around the strong reflection object, based on a relative distance to the strong reflection object;
    a calculation means that calculates power which is the signal strength for the estimation orientation by generating an orientation spectrum in the estimation orientation based on a frequency component corresponding to the relative distance; and a determination means that determines whether there is the target in the estimation orientation based on the power.

* * * * *